US012625475B2

(12) United States Patent
Misra et al.

(10) Patent No.: US 12,625,475 B2
(45) Date of Patent: May 12, 2026

(54) CONTROL SYSTEM FOR CARBON INTENSITY MANAGEMENT IN A HYDROGEN SUPPLY NETWORK

(71) Applicant: Air Products and Chemicals, Inc., Allentown, PA (US)

(72) Inventors: Pratik Misra, Breinigsville, PA (US); Sanjay Mehta, Orefield, PA (US)

(73) Assignee: AIR PRODUCTS & CHEMICALS, INC., Allentown, PA (US)

( * ) Notice: Subject to any disclaimer, the term of this patent is extended or adjusted under 35 U.S.C. 154(b) by 441 days.

(21) Appl. No.: 18/235,429

(22) Filed: Aug. 18, 2023

(65) Prior Publication Data

US 2025/0060708 A1 Feb. 20, 2025

(51) Int. Cl.
| | |
|---|---|
| *G05B 13/02* | (2006.01) |
| *C10G 9/00* | (2006.01) |
| *G06Q 10/0832* | (2023.01) |
| *G06Q 50/06* | (2024.01) |

(52) U.S. Cl.
CPC ....... *G05B 13/021* (2013.01); *G06Q 10/0832* (2013.01); *G06Q 50/06* (2013.01)

(58) Field of Classification Search
CPC .. G05B 13/021; G06Q 10/0832; G06Q 50/06; G06Q 50/04; G06Q 10/06; Y02P 20/133
See application file for complete search history.

(56) References Cited

U.S. PATENT DOCUMENTS

| | | | |
|---|---|---|---|
| 2018/0038638 A1* | 2/2018 | Guillard | F25J 1/0082 |
| 2022/0042406 A1* | 2/2022 | Whikehart | C10L 3/06 |
| 2022/0043406 A1 | 2/2022 | Whikehart et al. | |

FOREIGN PATENT DOCUMENTS

WO 2022265647 A1 12/2022

* cited by examiner

*Primary Examiner* — Randy Boyer
*Assistant Examiner* — Juan C Valencia
(74) *Attorney, Agent, or Firm* — Matthew R. Weaver

(57) ABSTRACT

A computer-implemented method of providing hydrogen having a defined carbon intensity (CI) value to an end user location, the process comprising: selecting a total end-to-end maximum CI value for the hydrogen from production to delivery of the hydrogen to an end user location; receiving one or more feedstocks; receiving product CI values associated with each feedstock and/or the produced hydrogen; receiving demand data defining the end user demand for the hydrogen; receiving renewable power data; defining, in an optimization model, a plurality of constraints; generating, using the optimization model, a control strategy for control of the one or more industrial plants; and controlling the industrial plants in accordance with the values of the control variables to process the one or more feedstocks in order to provide a required quantity of hydrogen meeting the selected total end-to-end maximum CI value for use by an end user.

18 Claims, 8 Drawing Sheets

CONTROL SYSTEM FOR CARBON INTENSITY MANAGEMENT IN A HYDROGEN SUPPLY NETWORK

FIELD OF THE INVENTION

The present invention relates to a method and system for control of one or more industrial processes in a hydrogen supply network. More particularly, the present invention relates to the control of one or more industrial processes in a hydrogen supply network in order to meet carbon intensity (CI) constraints.

BACKGROUND OF THE INVENTION

Industrial gas supply networks comprise one or more processes defining the production, transformation, transporting and distribution of gases for end-user applications.

In general, the inputs to industrial gas supply networks are feedstock elements (which may include raw materials and/or gaseous or liquid chemicals for production of gas or gas precursors) and energy sources to power those production and refining processes. The ultimate outputs of industrial gas supply networks are gaseous and/or liquified products delivered to end users. In certain applications, industrial gases may be used as fuel gases or liquified fuel gases for end users.

Fuel supply networks are of significant importance because they supply fuels vital for the functioning of economies around the world. However, fuel supply networks are increasingly scrutinized because the production, processing, distribution, and end uses of fuels are often associated with the environmental pollutants.

The technical field of the supply and use of fuels has undergone significant changes in recent years. Many of these changes have been driven by the urgent need to reduce greenhouse gas emissions and mitigate the impacts of climate change. As a result, there has been a growing interest in the development of low carbon and renewable fuels that can help to reduce the carbon intensity (CI) of transportation and other energy-intensive sectors.

Governments around the world have been implementing strict limits on the CI of fuels used in various applications. These limits have spurred innovation in the production, transportation, and processing of low carbon fuels, as well as the development of new technologies and systems for managing their CI throughout a fuel supply network.

One area of particular interest in this field is the production of fuels using renewable energy sources, such as solar, wind, and hydroelectric power. By harnessing these clean energy sources, it is possible to produce fuels with very low to zero CI at the point of production. Examples of such fuels include green ammonia, green hydrogen, and other low carbon fuels that can be used in a variety of applications, from powering vehicles to providing energy for industrial processes.

However, the production of low carbon fuels is only one part of the equation. In order to ensure that these fuels maintain their low CI throughout the supply chain, it is necessary to carefully manage their transportation, intermediate processing, and final delivery to end users. This involves making a series of complex decisions including, but not limited to, factors such as ship routing, fuel selection and transportation speed and selection of land-based transportation routes and methods for delivery of the fuel to end users.

In addition to transportation, the intermediate processing stages of low carbon fuels can also have a significant impact on the overall CI of a fuel. For example, considering hydrogen as a low carbon fuel, these stages may include operations such as cracking ammonia to produce green hydrogen, compressing hydrogen for pipeline delivery, and liquefying hydrogen for long-distance transportation by ship, truck or train.

Each of these processes requires energy input, which can contribute to the CI of the final fuel product. Therefore, it is essential to develop efficient and effective control methods for managing the energy consumption and CI of these intermediate processing operations.

For a fuel such as hydrogen to qualify as a low carbon or renewable fuel there is a strict limit on its CI value at the end user location. This is typically imposed by governments. An example of such a limit is the RED II requirement which specifies 28.2 gCO2e/MJ for renewable liquid and gaseous fuels of non-biological origin (RFNBO) in Europe.

Despite the progress that has been made in this field, there are still many shortcomings and limitations associated with existing implementations of CI-based fuel processes. For example, current systems may not be able to effectively manage the complex trade-offs between cost, CI, product demand and availability, or they may lack the flexibility to adapt to changing market conditions and regulatory requirements.

Therefore, there exists a need in the art to provide more effective methods and systems to address these issues.

SUMMARY

The following introduces a selection of concepts in a simplified form in order to provide a foundational understanding of some aspects of the present disclosure. The following is not an extensive overview of the disclosure and is not intended to identify key or critical elements of the disclosure or to delineate the scope of the disclosure. The following merely summarizes some of the concepts of the disclosure as a prelude to the more detailed description provided thereafter.

In general terms, the present disclosure is directed to a process for producing hydrogen with a defined carbon intensity value, using an industrial processing facility powered at least in part by renewable energy sources. This process involves selecting a maximum carbon intensity value for the hydrogen, receiving a feedstock with a carbon intensity value, receiving demand data for the hydrogen, and defining constraints for the process. An optimization model is then used to generate a control strategy for the industrial processing facility to produce hydrogen meeting the selected carbon intensity value. Advantageously, the invention provides a comprehensive decision-making system that optimizes the production and transportation of low carbon fuels, while minimizing costs and ensuring compliance with strict carbon intensity (CI) requirements imposed by governments and regulatory bodies.

Several preferred aspects of the methods and systems according to the present invention are outlined below.

Aspect 1: A computer-implemented method of providing hydrogen having a defined carbon intensity (CI) value to an end user location, the process being executed by at least one hardware processor and comprising: selecting, using a computer system, a total end-to-end maximum CI value for the hydrogen from production to delivery of the hydrogen to an end user location in order to meet predetermined CI requirements for the hydrogen; receiving, by an industrial processing facility having one or more industrial plants powered at least in part by renewable power sources, one or more feedstocks, the one or more feedstocks being processed by the one or more industrial plants to provide hydrogen; receiving, using a computer system, one or more product CI values associated with each feedstock and/or the produced hydrogen; receiving, using a computer system, demand data defining the end user demand for the hydrogen, the end user demand for the hydrogen being defined as a quantity of hydrogen required as a function of time; receiving, using a computer system, renewable power data related to the available renewable power from the renewable power sources as a function of time; defining, in an optimization model, a plurality of constraints, the constraints being selected from the group of: the maximum CI value; the one or more product CI values; the demand data; and the renewable power data; generating, using the optimization model, a control strategy for control of the one or more industrial plants operable to satisfy the one or more constraints, the control strategy comprising values of one or more control variables for control of operational parameters of the one or more industrial plants; and controlling the industrial plants in accordance with the values of the control variables to process the one or more feedstocks in order to provide a required quantity of hydrogen meeting the selected total end-to-end maximum CI value for use by an end user.

Aspect 2: A computer-implemented method according to Aspect 1, wherein the one or more product CI values comprises, for each feedstock, a first CI value for production of the feedstock in a production facility and a second CI value for transportation of the feedstock from the production facility to the industrial processing facility.

Aspect 3: A computer-implemented method according to Aspect 2, wherein the one or more product CI values comprises a third CI value defining the CI value for onward transportation of a predetermined quantity of hydrogen from the industrial processing facility to the end user location.

Aspect 4: A computer-implemented method according to Aspect 1, 2 or 3, wherein a feedstock comprises ammonia and an industrial plant comprises an ammonia cracker plant to produce hydrogen.

Aspect 5: A computer-implemented method according to Aspect 4, wherein one or more control variables comprise the hydrogen production rate of the ammonia cracker plant.

Aspect 6: A computer-implemented method according to Aspect 4 or 5, wherein one or more control variables comprise the selection of the type of cracker fuel for operating the ammonia cracker plant from one or more of: natural gas; biogenic natural gas; and ammonia.

Aspect 7: A computer-implemented method according to any one of Aspects 1 to 6, wherein an industrial plant comprises a hydrogen liquefier plant.

Aspect 8: A computer-implemented method according to Aspect 7, wherein one or more control variables comprises the production rate of the hydrogen liquefier plant.

Aspect 9: A computer-implemented method according to any one of Aspects 1 to 8, wherein an industrial plant comprises a hydrogen compressor arrangement.

Aspect 10: A computer-implemented method according to Aspect 9, wherein one or more control variables comprise the operation rate of the hydrogen compressor arrangement.

Aspect 11: A computer-implemented method according to any one of Aspects 1 to 10, wherein one or more control variables relate to selection of the power source for powering the industrial processing facility as a function of time.

Aspect 12: A computer-implemented method according to Aspect 11, wherein the power source is selected from one or more renewable power sources and/or grid power.

Aspect 12A: A computer-implemented method according to any one of Aspects 1 to 12, wherein the hydrogen comprises a hydrogen fuel.

Aspect 12B: A computer-implemented method according to any one of Aspects 1 to 12, wherein the industrial plants comprise one or more of: an ammonia cracker, a hydrogen liquefier and a hydrogen compressor arrangement.

Aspect 12C: A computer-implemented method according to any one of Aspects 1 to 12B, the optimization model may define the received data as a set of non-linear equations.

Aspect 12D: A computer-implemented method according to Aspect 12C, wherein the control variables are generated by solving the set of non-linear equations.

Aspect 12E: A computer-implemented method according to any one of Aspects 1 to 12D, wherein inputs to the optimization model comprise one or more of: predicted available renewable power as a function of time for a future time window; spot power price as a function of time for a future time window for renewable power and/or grid power; natural gas and/or biogas price as a function of time for a future time window.

Aspect 12F: A computer-implemented method according to any one of Aspects 1 to 12E, wherein an input to the optimization model comprises historical time-dependent operational characteristic data for the industrial plants.

Aspect 12G: A computer-implemented method according to any one of Aspects 1 to 12F, wherein the optimization model generates a control strategy for a predetermined time period.

Aspect 12H: A computer-implemented method according to Aspect 12G, wherein the optimization model generates values for the control variables at predetermined discrete intervals within the predetermined time period.

Aspect 12I: A computer-implemented method according to any one of Aspects 1 to 12H, wherein the control variables generated as part of the control strategy are utilized to generate a set of control set points for the industrial plants.

Aspect 13: An industrial processing facility operable to provide hydrogen having a defined carbon intensity (CI) value to an end user location, the industrial processing facility having one or more industrial plants powered at least in part by renewable power sources, and a computer system comprising at least one hardware processer, the industrial processing facility being configured to carry out the steps of: selecting, using a computer system, a total end-to-end maximum CI value for the hydrogen from production to delivery of the hydrogen to an end user location in order to meet predetermined CI requirements for the hydrogen; receiving, by an industrial processing facility, one or more feedstocks, the one or more feedstocks being processed by the one or more industrial plants to provide hydrogen; receiving, using a computer system, one or more CI values associated with each feedstock and/or the produced hydrogen; receiving, using a computer system, demand data defining the end user demand for the hydrogen, the end user demand for the hydrogen being defined as a quantity of hydrogen required as a function of time; receiving, using a computer system, renewable power data related to the available renewable power from the renewable power sources as a function of time; defining, in an optimization model, a plurality of constraints, the constraints being selected from the group of: the maximum CI value; the one or more CI values; the demand data; and the renewable power data; generating, using the optimization model, a control strategy for control of the one or more industrial plants operable to satisfy the one or more constraints, the control strategy comprising values of one or more control variables for control of operational parameters of the one or more industrial plants; and controlling the industrial plants in accordance with the values of the control variables to process the one or more feedstocks in order to provide a required quantity of hydrogen meeting the selected total end-to-end maximum CI value for use by an end user.

Aspect 14: An industrial processing facility according to Aspect 13, wherein an industrial plant comprises an ammonia cracker plant to produce hydrogen and wherein a feedstock comprises ammonia.

Aspect 15. An industrial processing facility according to Aspect 14, wherein one or more control variables comprise the hydrogen production rate of the ammonia cracker plant.

Aspect 16. An industrial processing facility according to Aspect 14 or 15, wherein one or more control variables comprise the selection of the type of cracker fuel for operating the ammonia cracker plant from one or more of: natural gas; biogenic natural gas; and ammonia.

Aspect 17. An industrial processing facility according to any one of Aspects 13 to 16, wherein an industrial plant comprises a hydrogen liquefier plant.

Aspect 18. An industrial processing facility according to Aspect 17, wherein one or more control variables comprises the production rate of the hydrogen liquefier plant.

Aspect 19. An industrial processing facility according to any one of Aspects 13 to 18, wherein an industrial plant comprises a hydrogen compressor arrangement.

Aspect 20: A non-transitory computer readable storage medium storing a program of instructions executable by a machine to perform a method of providing hydrogen having a defined carbon intensity (CI) value to an end user location, the process being executed by at least one hardware processor and comprising: selecting, using a computer system, a total end-to-end maximum CI value for the hydrogen from production to delivery of the hydrogen to an end user location in order to meet predetermined CI requirements for the hydrogen; receiving, by an industrial processing facility having one or more industrial plants powered at least in part by renewable power sources, one or more feedstocks, the one or more feedstocks being processed by the one or more industrial plants to provide hydrogen; receiving, using a computer system, one or more CI values associated with each feedstock and/or the produced hydrogen; receiving, using a computer system, demand data defining the end user demand for the hydrogen, the end user demand for the hydrogen being defined as a quantity of hydrogen required as a function of time; receiving, using a computer system, renewable power data related to the available renewable power from the renewable power sources as a function of time; defining, in an optimization model, a plurality of constraints, the constraints being selected from the group of: the maximum CI value; the one or more CI values; the demand data; and the renewable power data; generating, using the optimization model, a control strategy for control of the one or more industrial plants operable to satisfy the one or more constraints, the control strategy comprising values of one or more control variables for control of operational parameters of the one or more industrial plants; and controlling the industrial plants in accordance with the values of the control variables to process the one or more feedstocks in order to provide a required quantity of hydrogen meeting the selected total end-to-end maximum CI value for use by an end user.

6

BRIEF DESCRIPTION OF THE DRAWINGS

Embodiments of the present invention will now be described by example only and with reference to the figures in which.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

The present invention is directed to the technical field of the development of advanced optimization and control systems that can simultaneously manage multiple variables, including but not limited to the rate of liquefaction, the rate and type of fuel used in cracking, the control of compression system and the selection of the source of electricity for processing operations. In embodiments, by integrating these systems with real-time data on renewable power availability, energy prices, CI limits, and production rates, it is possible to make more informed decisions that can help to minimize costs while ensuring that CI requirements are met.

The technology described herein provides technical improvements to the existing control of variables related to industrial fuel production, transportation and downstream processing to produce and supply a fuel to end users. Technical improvements enable an intermediate processing facility comprising one or more industrial processing facilities to be controlled in order to manage technical considerations and constraints on industrial fuel production and supply. One such technical constraint is the need to meet CI requirements for a fuel to be classed as a low carbon fuel.

In particular, the present technology described herein assists in enabling control of industrial fuel processes to meet particular technical requirements on gas supplied to end users for fuel. Intermediate processing contributes the bulk (60-65%) of total CI values for a fuel produced in such a network. The present technology enables control and optimization of intermediate processes such as ammonia cracking, hydrogen liquefaction and hydrogen compression to enable strict industrial CI targets to be met.

Overview of Fuel Supply Network

Figure 1:
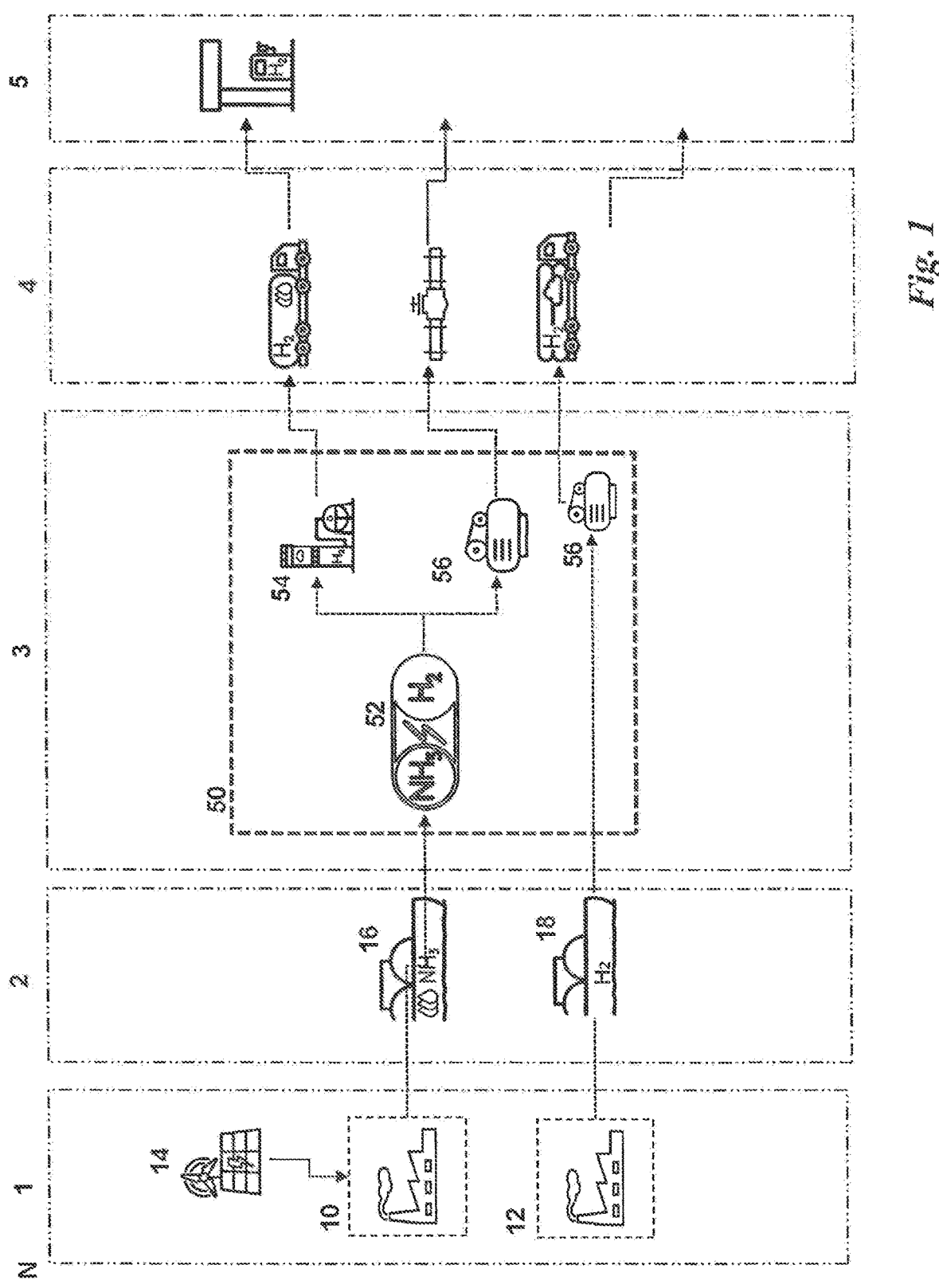
FIG. 1 is a schematic diagram of a generalised fuel supply network.

FIG. 1 shows a general schematic diagram of an exemplary fuel supply network N for illustration purposes. In embodiments, the fuel supply network N comprises a hydrogen fuel supply network. The schematic diagram is represented such that the supply chain of the fuel supply network N is broken into five specific steps, bounded by dot-dash lines. In embodiments, the supply chain of the fuel supply network N comprises a production step 1, an initial transportation step 2, an intermediate processing step 3, a further transportation step 4 and an end user delivery step 5.

In FIG. 1, the production step 1 of the fuel supply network N comprises production of fuel from feedstocks. Fuel produced in the production step will generally be "green" fuel produced using renewable energy. Hydrogen and/or ammonia may be produced from an ammonia production plant 10. An ammonia production plant 10 may, in examples, comprise a hydrogen production plant, an air separation unit (ASU) and an ammonia synthesis plant. Storage for produced hydrogen and ammonia may also be provided.

The ammonia production plant 10 uses water and air as feedstocks to produce hydrogen and nitrogen which are then as synthesis gases to form ammonia in an ammonia loop operating on the Haber-Bosch process.

Additionally or alternatively, liquid or gaseous hydrogen may be produced by other means in an industrial production facility 12. Hydrogen may be produced by electrolysis of feedstocks such as water, brine or steam, or through steam reforming using methane as a feedstock.

In order to reduce the CI of the production process, electricity for powering the ammonia production plant 10 may generated at least in part by renewable energy sources such as wind and/or the solar power sources 14 although other sources may optionally be utilised. Green fuel produced using renewable power sources will have very low to zero CI at the point of production.

Carbon Intensity values for the respective production process are calculated at the production site and available for use for further processing, as described below.

The initial transportation step 2 involves transportation of the fuel and/or fuel feedstock (in the case of produced ammonia) from the production site 10, 12 to an intermediate processing facility 50. Initial transportation of the produced ammonia and/or hydrogen will typically involve international transportation by transport ship or seaborne tanker 16, 18.

The Carbon Intensity of this process is required to be determined and will depend heavily on the ship itself, for example its size, weight, efficiency and fuel source, as well as logistical decisions regarding the route taken by the ship and the speed of the ship along that route. Decisions must be made about where to send the ship, using what fuel, and at what speed. These factors and decisions impact the CI value for the transportation process at step 2, as well as the end cost of the fuel and the ability to meet customer demand.

Whilst the above examples have been given in the context of seaborne transport, this need not be the case. For example, the initial transportation of the produced fuel or fuel feedstock to the intermediate processing facility may involve transportation by pipeline or by road tanker if appropriate.

In other examples, the initial transportation stage may also involve more than one transportation leg and may involve one or more temporary storage terminals. Alternatively or additionally, if more than one leg of transport is required, each leg may be via different transport means as appropriate and as required.

The CI values for the initial transportation step 2 can be calculated after the fact or can be estimated based on known parameters. However, in general, production and initial transportation contribute to a relatively low percentage of the total CI value for a fuel supplied to an end user.

For example, considering a green ammonia supply chain where green ammonia is produced by an ammonia production plant 10 using renewable power sources 14 and then transported by ship 16 to an intermediate processing facility 50, the production and initial transportation steps 1, 2 contribute only about 20% of the total CI for the fuel supplied to the end user. The bulk of the CI value for a fuel supplied to an end user is contributed by the intermediate processing step 3, described below.

The intermediate processing step 3 is shown in detail in FIG. 1. Many fuels or feedstock elements require intermediate processing before transportation to end users. For example, if liquid ammonia is produced in step 1 and transported in step 2, the liquid ammonia feedstock requires processing to produce the hydrogen fuel for onward transportation to the end user.

This processing is done in intermediate processing step 3 at intermediate processing facility 50. Intermediate processing facility 50 may be located geographically closer to the end user sites than the production facilities 10, 12. However, this need not be the case and intermediate processing facility 50 may simply be a cost-effective and convenient hub for processing and onward transportation.

In embodiments, multiple processes may be carried out at the intermediate processing facility 50. In embodiments, intermediate processing facility 50 may comprise industrial plants in the form of an ammonia cracker 52, a hydrogen liquefier 54 and one or more hydrogen compressors 56. However, this need not be the case and only one, or subsets of the above elements may be provided. Alternatively, additional industrial plants may be provided.

In addition, the above industrial plants 52, 54 and 56 may be provided as part of the intermediate processing step 3 but in different geographical locations as required. The term "intermediate processing facility" 50 is not intended to be geographically or functionally limiting and may include one or more sub-facilities either located on a common plant site or geographically distributed as required.

Figure 2:
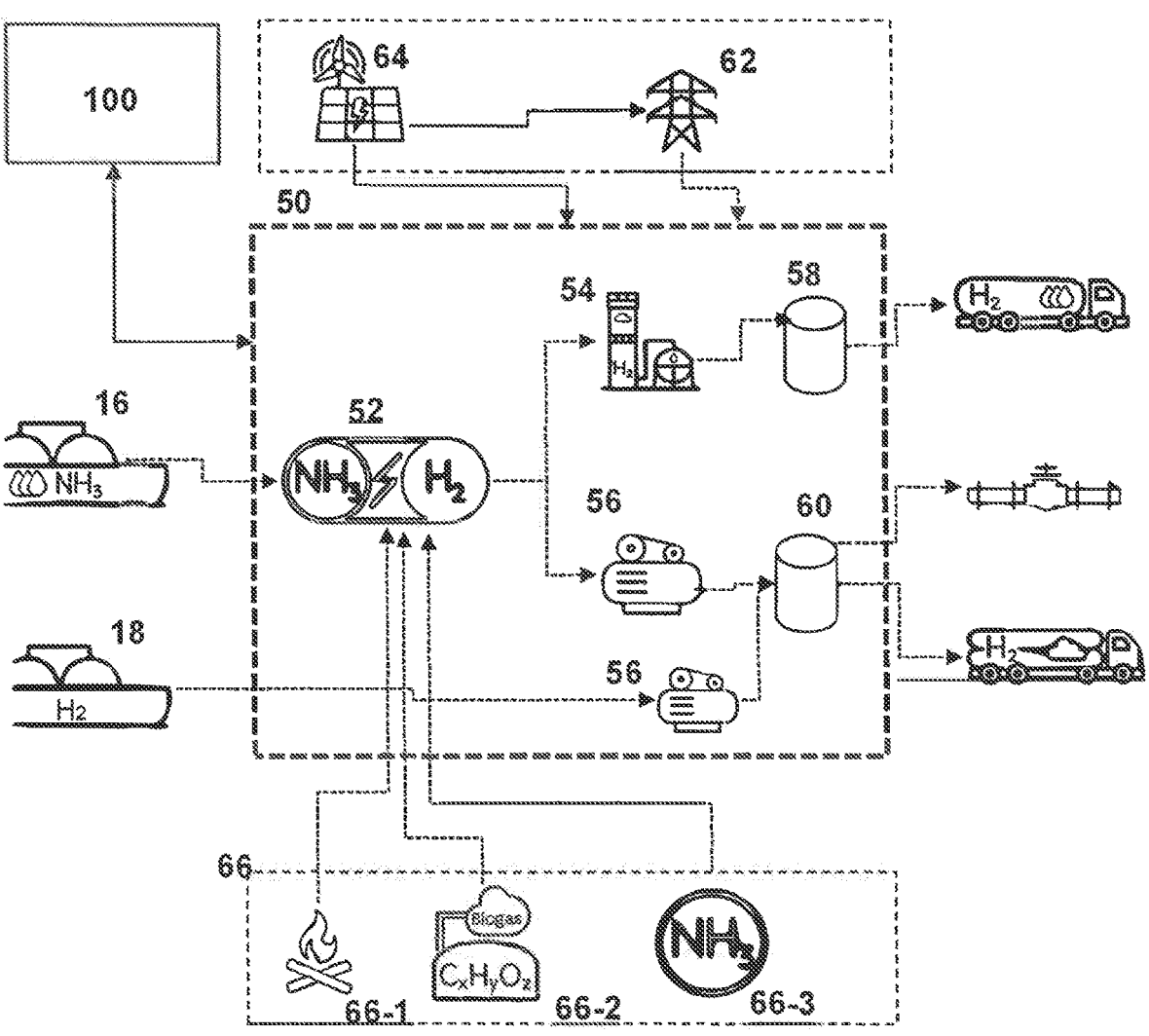
FIG. 2 is a schematic diagram of an intermediate processing facility forming part of the fuel supply network of FIG. 1.

In addition, storage (FIG. 2) may be provided for hydrogen and/or ammonia at, or in communication with, the intermediate processing facility 50. For example, any hydrogen surplus to immediate requirements may be stored in a hydrogen storage unit.

The storage unit may comprise any suitable a plurality of short-term and longer-term storage options with different sizes, filling/discharge rates, and roundtrip efficiencies. Any ammonia excess to requirements or for subsequent processing could be stored in a similar fashion.

The operation and control of the intermediate processing facility 50 will be described below. However, as described, the intermediate processing step 3 involves processing steps such as like cracking, liquefaction, repressurizing, and supplying gas to pipelines or bulk tube trailers. All of these processes require significant amounts of energy and add additional CI to the product. Indeed, intermediate processing steps account for the bulk of the CI value of the final fuel product at around 60-65% of the total CI value for the fuel. Thus, control and efficiency optimizations can lead to significant gains as described below.

Once the intermediate processing steps have been carried out in step 3, the fuel product is again transported in further transportation step 4. This may involve any suitable mechanism for onward transport and may, in non-limiting examples, involve transportation by ship, aircraft, truck, fuel tanker, pipeline, or barge. Final transportation to the delivery location contribute another 15-20% to the total CI value. Therefore, optimizations can be made here if necessary, and decisions with regard to transportation mode, route, speed and fuel usage can impact CI, cost and product availability.

Finally, at step 5 the hydrogen is delivered to the end user. End user locations may use the hydrogen directly (e.g. as part of an industrial process outside of the fuel supply network N) or may supply the hydrogen fuel to third party customers or users of the end user location (e.g. a fuel station or depot).

For hydrogen as a low carbon product, end user locations may, in non-limiting examples, include industrial processing sites or facilities. For hydrogen as a low carbon fuel, the end user locations may comprise hydrogen fueling stations or hydrogen fuel depots. However, it is to be understood that the end use for the hydrogen is not part of the fuel supply network N and is not directly material to the operation of the present invention.

The final CI value for a fuel supplied to an end user depends on each of steps 1 to 4 discussed above. When a fuel is sold as a green fuel, there will be stringent CI requirements for that fuel. These are governed by rules such as, for example, RED II in Europe.

Industrial users CI limits may also be government regulated or self-imposed. In addition, certain fuel supply pathways may have designated carbon intensity quantities and are known as "reportable pathways". This may correlate with specific pathways and certain government bodies may utilise the value of reportable pathways.

For example, in the state of California, a reportable pathway would be one that requires an initial certification and subsequent periodic verification. Thus, a reportable pathway with a designated carbon intensity quantity would aim to maintain throughputs within the component processes forming the reportable pathway at values which would maintain the carbon intensity of the pathway within designated carbon intensity values.

All the decisions taken in steps 2 to 4 influence the CI at the end user location although, as shown above, step 3 is a significant contributor to the overall CI value. Therefore, technical problems exist with managing CI values at intermediate processing steps. Embodiments aim to address those issues.

Intermediate Processing Facility

Figure 3:
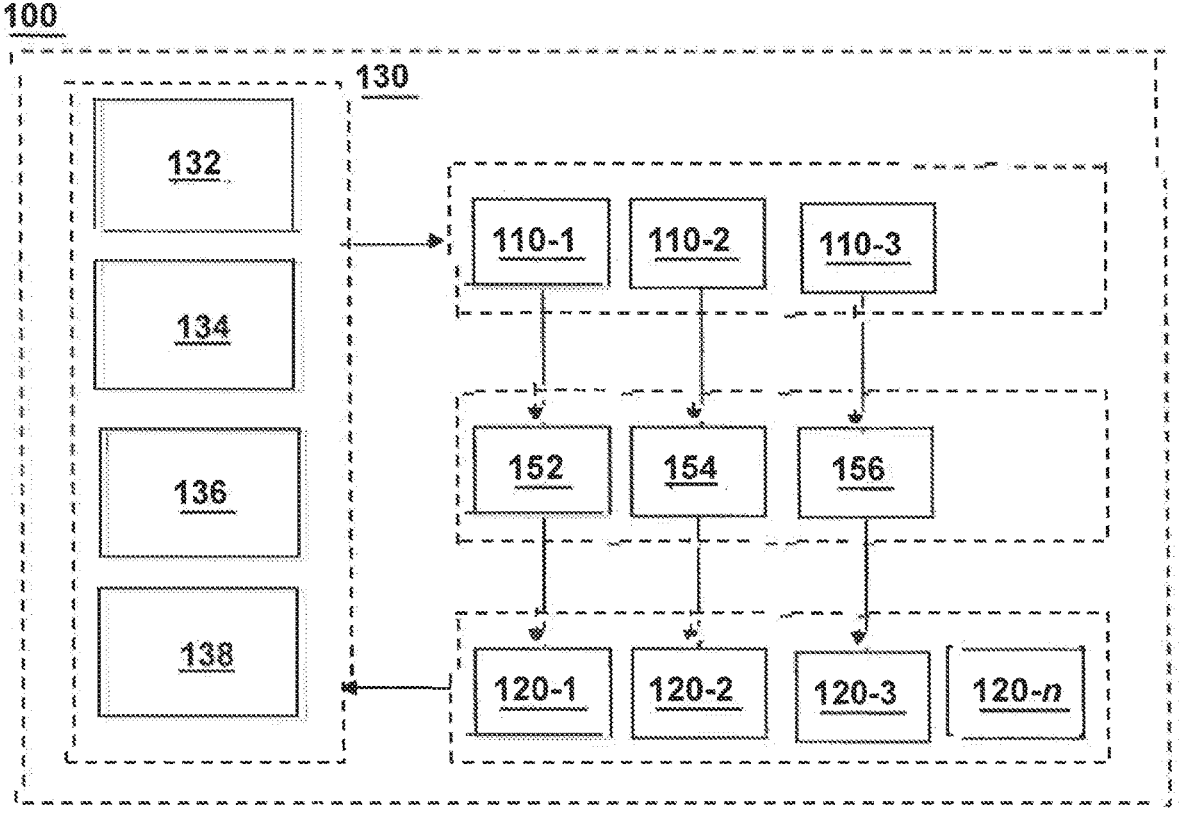
FIG. 3 is a schematic diagram of a control system according to an embodiment.

FIG. 3 shows the intermediate processing facility 50 in more detail. The intermediate processing facility 50 comprises industrial plants in the form of the ammonia cracker 52, the hydrogen liquefier 54 and one or more hydrogen compressors 56.

Storage systems 58, 60 are provided to store produced liquid hydrogen (in storage 58) and compressed gaseous hydrogen (in storage 60). Typical storage systems may include pressure vessels and/or pipe segments connected to a common inlet/outlet header. The pressure vessels may be spheres, for example, to about 25 m in diameter, or "bullets" which are horizontal vessels with large L/D ratios (typically up to about 12:1) with diameters up to about 12 m. In certain geographies, underground caverns may be included as storage systems.

In addition, the intermediate processing facility 50 requires a power supply. There are multiple options for power—a main grid connection 62 or one or more renewable power sources 64 such as wind and/or solar. The local grid connection is such that the intermediate processing facility 50 can be supplied with renewable power, grid power or a combination of the two. In addition, power generated via renewable sources can be provided back to the grid connection, for example in situations where power generation from renewable sources exceeds the required power for the intermediate processing facility 50 at particular points in time.

The use of renewable power sources for powering operations of the intermediate processing facility 50 is required in order to meet CI requirements for specific types of fuel. However, strategic management is required in order to ensure optimal use of the available renewable power.

Intermediate Processing Facility—Industrial Processes

If ammonia is delivered to the intermediate processing facility 50, the ammonia will require cracking to produce hydrogen. Hydrogen will then require either compression for gaseous storage or liquefaction. These industrial processes will now be described. Cracking ammonia, liquefying hydrogen, and compressing hydrogen are chemical processing operations whose energy consumption patterns and CI can be managed via improved control methods as described below.

Ammonia Cracker

The ammonia cracker 52 industrial plant comprises a gas phase catalytic reactor. The chemical reaction extent within the reactor is governed by process parameters including temperature T and pressure P.

The chemical products resulting from the catalytic reaction include hydrogen, nitrogen, and unreacted ammonia. This product is subjected to a further step of purification to extract pure hydrogen. Once the hydrogen purification has been carried out, the produced nitrogen is vented, and any remaining ammonia is recycled back into the catalysis processing step.

The primary gas phase catalytic reaction is endothermic and so requires external energy input for the reaction to proceed. This energy is provided by burning a suitable fuel from a fuel source 66. The fuel source 66 may be selected as appropriate according to requirements. In embodiments, the fuel source 66 may be selected from one or more of: natural gas 66-1, biogenic methane 66-2 or unreacted ammonia 66-3. The fuel source 66 is burned in burners outside of the reactor tubes in order to power the endothermic cracking reaction.

The selection of fuel source 66-1, 66-2, 66-3 is dependent upon a number of factors. Cost and availability will in part determine which fuel source is used. In addition, the fuel source 66 that is used contributes to the CI of the product of the reaction. Natural gas 66-1 has the highest CI value. In contrast, biogenic methane 66-2 has a negative CI value. Finally, ammonia has a CI value that depends upon the CI values from production in step 1 and initial transportation in step 2. However, in general, ammonia produced in accordance with steps 1 and 2 above (i.e. production of "green" ammonia using renewable power sources) will have a lower CI value than natural gas 66-1.

The use of ammonia 66-3 as a direct fuel source for the cracking operation will also reduce the ammonia available for hydrogen production, impacting upon demand, cost and CI values across the supply network N.

The ammonia cracker 52 is run under continuous operation. In embodiments, the rate at which the cracker is operated may be varied in accordance with a desired control strategy as discussed in more detail below. The operational rate of the ammonia cracker 52 may also be dependent upon on downstream elements such as the liquefier 54, onward transportation requirements and end user demand for hydrogen.

Hydrogen Liquefier

For end users such as hydrogen refuelling stations, it is optimal to liquefy hydrogen for transportation to end user locations. Therefore an industrial plant in the form of a hydrogen liquefier 54 may be provided. A liquefaction operation comprises a refrigeration cycle involving compression, expansion, and heat exchange. Refrigerants such as nitrogen or hydrogen may be used.

Considerable energy is needed to operate the compression cycle of the liquefaction process, which is particularly pronounced for a small molecule such as hydrogen. The high energy consumption of this process adds significantly to the CI value of the produced hydrogen and requires optimization and management.

Hydrogen liquefiers 54 are available in a range of sizes for producing specific volumes of liquid hydrogen, for example 60 tons per day (tpd), 35 tpd, 30 tpd or 10 tpd. However, the amount of liquid hydrogen produced in a given day is in general lower than the specified capacity due to operational reasons.

In embodiments, this is utilized by a control system to enable the rate at which liquefier 54 is operated to be varied at different times of a day according to a control strategy. The ability to vary the liquefier operation rate may be an important element in a CI optimization and management strategy.

Hydrogen Compression

Hydrogen compressors may be required at the intermediate processing facility 50 in order to enable compressed gaseous hydrogen to be provided to end users via pipelines or "tube trailer" transporters. Therefore, an industrial plant in the form of a hydrogen compressor arrangement 56 may be provided.

"Tube trailers" comprise a plurality of long cylinders stacked on a truck trailer. Each cylinder comprises gaseous hydrogen compressed to pressures of the order of 180 bar. Tube trailers are currently limited to pressures of 250 bar by the U.S. Department of Transportation (DOT) regulations, however in certain cases higher pressures (e.g., 500 bar) can be used.

The hydrogen compressors 56 may take any suitable form, depending upon the required end pressure. Each hydrogen compressor 56 may have only a single compression stage utilizing, for example, a centrifugal compressor or a reciprocal compressor.

Alternatively, one or more of the hydrogen compressors 56 may comprise multiple stages. For example, one or more of the hydrogen compressors 56 may comprise a first Low Pressure (LP) compression system immediately downstream of the supply outlet, followed by a medium pressure (MP) compression stage.

In embodiments, the low pressure (LP) compression system may be operable to compress the produced gas from a first feed pressure from the production facility or supply source to a second intermediate pressure greater than the first feed pressure. The LP compression system may, in embodiments, comprise one or more centrifugal compressors. Centrifugal compressors are well suited to handling large gas volumes at relatively low compression rates.

A medium pressure (MP) compression system may be located downstream of the LP compressor. The MP compression system may take any suitable form. In embodiments, the compression system may comprise one compressor or a train of compressors in series. In embodiments, the MP compression system may comprise a number of compression trains arranged in parallel, for example three compression trains. In embodiments, the MP compression system may comprise one or more trains of reciprocating compressors.

In embodiments, if required further steps can be performed to treat the hydrogen before onward transportation to the customer. For example, depending upon the condition of the hydrogen entering the compressor 56, a purification section may be required.

In embodiments, such a purification section may comprise a "DeOxo" unit in which oxygen is removed by the catalytic combustion of hydrogen to produce water and oxygen-depleted compressed hydrogen gas.

In embodiments, the purified hydrogen may also be dried in a drier such as an adsorption unit, for example, a temperature swing adsorption (TSA) unit, located downstream of the purification section. A discharge header is then located downstream of the purification section for supplying treated and compressed hydrogen gas for onward transport.

Compression of hydrogen requires energy and adds CI to the compressed hydrogen product supplied to the end user. Whilst the amount of energy consumed in this process is typically fixed, optimization decisions can still be taken to manage CI values in this process.

A control system 100 is provided for controlling and optimizing the operation of the intermediate processing facility 50 in order to meet strict technical and industrial constraints in the form of required CI levels. This will now be described in detail.

Control System 100

FIG. 3 shows a schematic of a control system 100 for controlling the industrial processes of the intermediate processing facility 50.

In embodiments, the present invention provides a method of, and system for, controlling processes within a fuel supply network. In embodiments, the control system 100 is operable to receive inputs from technical sources and determine optimum operating parameters for one or more industrial processes in the intermediate processing facility 50.

In embodiments, the present invention provides a control system 100 operable to enable selective control of processes within the fuel supply network N to achieve predetermined outcomes when operating the fuel supply network. In embodiments, one such predetermined outcome is to meet the CI value for a fuel supplied to an end user.

In embodiments, other outcomes may be to ensure the CI value is met whilst meeting consumer demand and ensuring efficient and safe operation of the plant processes and facilities, avoiding the need for shutdowns and/or operation outside of normal parameters.

The control system 100 enables control and/or management of a plurality of processes within the intermediate processing facility 50. These may include, but are not limited to, the processes discussed and described with reference to FIGS. 1 and 2.

As shown in FIG. 3, process 152 corresponds to cracking of ammonia to form hydrogen in the ammonia cracker 52. Process 154 corresponds to liquefaction of hydrogen in the liquefier 54. Process 156 corresponds to hydrogen compression using the compressor(s) 56.

The intermediate processing facility 50 comprise a multiplicity of processes each of which may have control systems for regulating the throughput of materials through each of the constituent processes. As noted above, at any given time, there is in general a throughput of materials through each process 152, 154, 156.

The control system 100 further comprises a control block 110 comprising a plurality of control elements 110-1, 110-2 . . . 110-$n$ associated with at least some of the processes 152, 154, 156.

In embodiments, the parameters controlled by the control block 110 may include operation rate of the process in question, type of power supply, amount of power, ramp rates, throughput rate of materials (e.g. feedstocks, intermediates, and fuels), selection of fuels (for the ammonia cracker 52). These parameters are typically regulated by these control elements/control systems 110-1, 110-2, 110-3.

Control systems typically maintain a control setpoint (e.g. a throughput or flow setpoint) and are associated with one or more sensors (such as, in non-limiting examples, flow rate meters, pressure sensors, temperature sensors etc.) and actuators (such as, in non-limiting examples, pumps, valves, compressors, or blowers) to regulate the throughput of materials through the process. These systems may comprise any suitable controller, for example, proportional-integral-derivative (PID) controllers.

Each process 152, 154, 156 will, in practice, have a maximum and minimum operational capacity. In addition, in a dynamic operation a maximum rate of change will apply (the ramp rate). These constraints are typically set by safety, mechanical, electronic, material or other physical constraints within the equipment.

The difference between the maximum and minimum operating points defines the range of operation. Process constraints place constraints on the maximum and minimum capacity for each process, together with constraints on the rate of change of production capacity (i.e. ramp rates) in response to controller set point changes. Physical equipment limitations, quality and/or safety parameters may also apply.

The above limitations may be determined by the control block 110 and the process(es) controlled by a throughput setpoint value either determined locally or provided by the master controller 130 (described below).

The control system 100 may, in embodiments, further comprise a data input block 120 arranged to receive inputs from particular sensors or other components in the fuel supply network N.

In embodiments, the process elements 52, 54, 56 of the intermediate processing facility comprises one or more sensors 120-1, 120-2 . . . 120-3. These sensors 120 enable reporting of process parameters, for example, in embodiments, the operation rate of the ammonia cracker 52, liquefier 54 and/or the or each compressor 56.

In addition, other data input elements 120-$n$ may be provided as required. These data input elements are not limited to sensors and sensor data and may include reporting or determined technical values on additional elements of the supply chain (e.g. steps 1, 2, 4 or 5).

An example may be the CI values for fuels or feedstocks that have been produced in step 1 and transported in step 2. In addition, the data input elements 120-$n$ may include data from other elements of the intermediate processing facility 50 not directly controlled or monitored by the control system 100.

In embodiments, this may include technical information relating to electricity availability or price as a function of time, or availability or CI values of fuels for use in the ammonia cracker 52, amongst others. In general, data input elements 120-$n$ may also include reporting of the Carbon Intensity output from a given process or step in the supply network N.

The control system 100 further comprises a master controller 130. The master controller 130 comprises at least one hardware processor 132. In embodiments, the master controller 130 further comprises an decision system 134. In embodiments, the master controller 130 may further comprise a control module 136 operable to provide control signals (e.g. control setpoints) to the control block 110 to control one or more control elements 110-1, 110-2, 110-3 of the process block 110. Finally, in embodiments, the master controller 130 may comprise a data input module 138 operable to receive and process sensor data and other data inputs from the data input block 120.

It will be understood that the above terms "module", "block" and "element" are non-limiting terms and do not necessarily imply any interconnection or grouping between the component parts of the systems 100, 110, 120, 130 which may be illustrated in a common grouping for clarity purposes only.

Decision System 134

In embodiments, the decision system 134 is operable to utilize data inputs from the data input block 120 to generate data for control of control elements of the intermediate processing facility 50 processes 152, 154, 156 via the control block 110 and control elements 110-1, 110-2, 110-3.

The decision system 134 system is implemented on a computer system utilizing at least one hardware processor 132 and receives inputs from the data input block 120 amongst others.

In general embodiments, the decision system 134 system solves an optimization problem to determine the values of four variables: A) the rate of operation 154 of the liquefier 54 as a function of time; B) the rate of operation of the ammonia cracker 52 as a function of time; C) the selection of fuel type 66 for use in the ammonia cracker 52 as a function of time; and D) the source of electrical power as a function of time.

For variables A), B) and C), optimization can be done based on the available power in order to meet CI limits. For example, variable A) can be selected to consume less power during hours where less renewable energy is available (e.g. during the night or during periods of reduced wind).

For variable C), for example, it is possible to select a lower CI fuel 66-1, 66-2, 66-3 for the ammonia cracker 52 in order to reduce CI values for hydrogen production if it is not possible to reduce CI elsewhere (for example, if it is necessary to use grid 64 power for the liquefier 54.

For variable D), there are multiple options for power-a main grid connection 62 or one or more renewable power sources 64 such as wind and/or solar. The local grid connection is such that the intermediate processing facility 50 can be supplied with renewable power, grid power or a combination of the two.

In addition, power generated via renewable sources can be provided back to the grid connection, for example in situations where power generation from renewable sources exceeds the required power for the intermediate processing facility 50 at particular points in time. The use of renewable power sources for powering operations of the intermediate processing facility 50 is required in order to meet CI requirements for specific types of fuel.

In embodiments, renewable power sources are in general required to run at least some of the processing operations 152, 154, 156 of the intermediate processing facility 50 in order to meet CI requirements. In embodiments, these processes 152, 154, 156 may be located at or close to shipping or other transport terminals which receive feedstocks such as ammonia following step 2 of the supply network N. As a result, there may not be a renewable power generation co-located with the intermediate processing facility 50 to power plant operations.

Therefore, in embodiments, renewable power may need to be procured through contracts with one or more energy companies. As a result, variable C) will also depend upon technical-commercial constraints such as any contracted amount of electrical energy generated from renewable sources for a given time period. In embodiments, the contracts may typically assign a portion of the capacity of the renewable energy site to the intermediate processing facility 50 for a period of time. The actual amount of renewable power will then depend upon the maximum stipulated in the contract and actual power being generated.

For example, there may be an upper limit based on a contract and the generated power that can be utilized in a predetermined interval (for example, 1 hour or 15 minutes). Any contracted renewable energy that is not used in a particular time period may be sold back to the grid 62 supplier.

Therefore, the amount of renewable power available in 15-minute increments over the next day will, in general, be known and may be provided by the energy company. This future renewable power availability is utilized by the decision system 134 to determine the optimal selection of power source and rates of operation of the elements 52, 54, 56 of the intermediate processing facility 50.

The decision system 134 may utilize any suitable optimization solution technology to derive the necessary outputs. Typically such problems are Mixed Integer Non Linear Programs (MINLP) because the process plant equations are non-linear and some of the decisions require some equipment to be run in one of a few possible modes leading to integer variables.

In embodiments, the optimization generates set points from time c+1 to c+p to balance the available power and resources and consumed power to generate sufficient hydrogen to meet user demand and the required CI limits for the product.

Specific Example of Decision System 134

The following embodiment illustrates a specific example of the operation of the decision system 134 in the context of an intermediate processing facility 50 having a ammonia cracker 52, a hydrogen liquefier 54 and one or more compressors 56 controlled and/or operationally scheduled in accordance with embodiments of the present method and system.

The decision system 134 utilizes the processor 132 to perform the necessary optimization. In addition, the decision system 134 receives data inputs from the data input block 130. This may include sensor data, empirical data or other technical data to enable the optimization to be carried out. In embodiments, the inputs into the system will now be discussed in detail.

Input 1: Availability of Renewable Power

Renewable power may need to be procured through contracts with one or more energy companies. Technical-commercial constraint inputs include any contracted amount of electrical energy generated from renewable sources for a given time period.

In embodiments, the contracts may typically assign a portion of the capacity of the renewable energy site to the intermediate processing facility 50 for a period of time. The actual amount of renewable power will then depend upon the maximum stipulated in the contract and actual power being generated.

For example, there may be an upper limit based on a contract and the generated power that can be utilized in a predetermined interval (for example, 1 hour or 15 minutes). Any contracted renewable energy that is not used in a particular time period may be sold back to the grid 62 supplier.

Figure 4A:
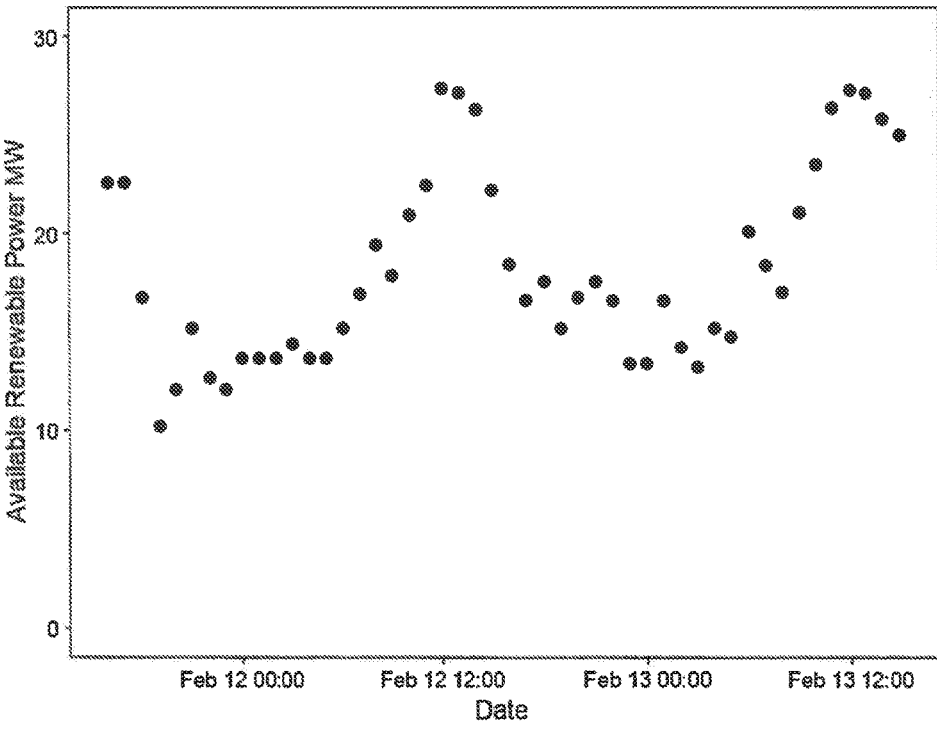
FIG. 4A is a graph showing an exemplary input variable for the decision system of an embodiment, the input variable comprising the available renewable power in MW (on the Y-axis) as a function of time (on the X-axis)

Therefore, the amount of renewable power available in 15-minute increments over the next day will, in general, be known and may provided by the energy company. FIG. 4A shows a graph of a typical profile of available renewable power in MW (on the Y-axis) as a function of time (on the X-axis).

This future renewable power availability is utilized by the decision system 134 to determine the optimal selection of power source and rates of operation of the elements 52, 54, 56 of the intermediate processing facility 50.

This data may be received by a data input element 120-$n$ of the data input block 120 and input to the data input module 138 for use by the decision system 134.

Input 2: Energy Cost as a Function of Time

In embodiments, energy prices may also be input into the decision system 134 as a further parameter to enable determination of future operation of the intermediate processing facility 50 whilst managing CI values.

In embodiments, five types of energy sources are available in the plant, namely renewable electricity, grid electricity, natural gas, biogenic gas, and ammonia. The first four are traded commodities where prices vary continuously on the open market.

Figure 4B:
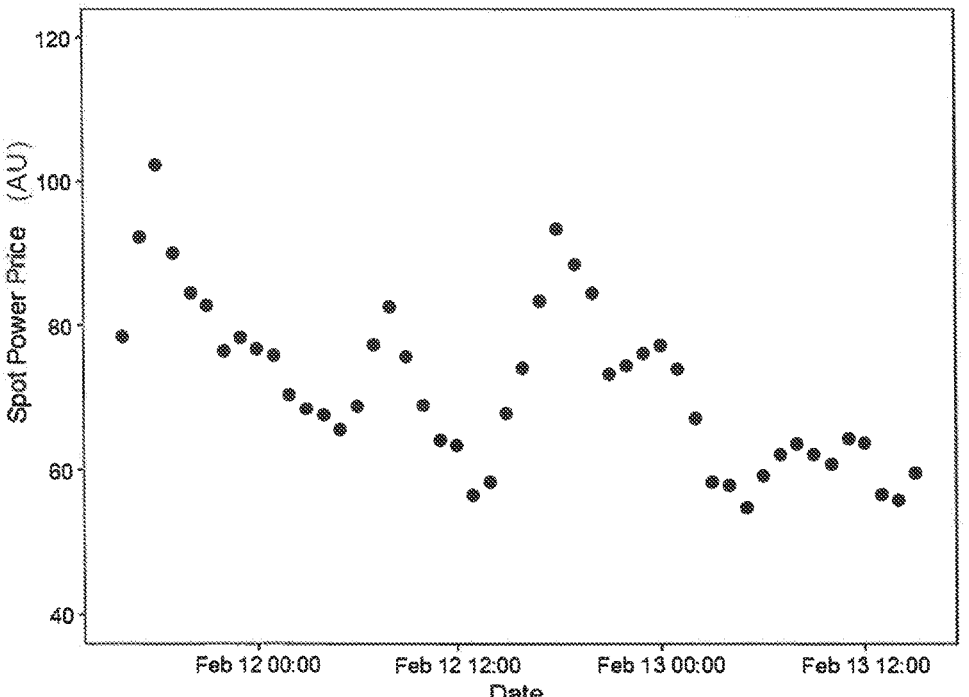
FIG. 4B is a graph showing another exemplary input variable for the decision system of an embodiment, the input variable comprising the spot power price in arbitrary units (AU) (on the Y-axis) as a function of time (on the X-axis)
Figures 4C, 4D:
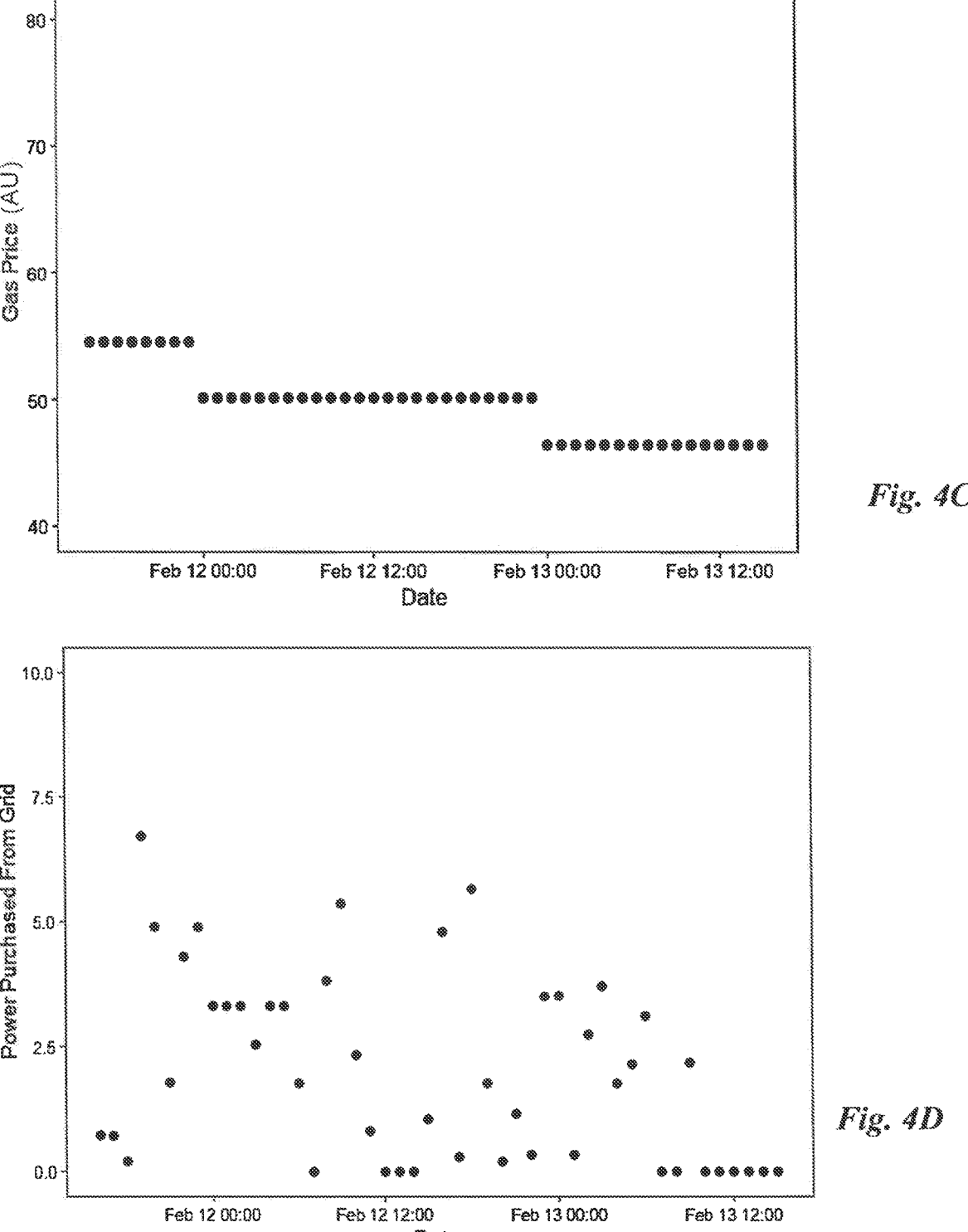
FIG. 4C is a graph showing another exemplary input variable for the decision system of an embodiment, the input variable comprising the natural gas price in arbitrary units (AU) (on the Y-axis) as a function of time (on the X-axis)
FIG. 4D is a graph showing another exemplary input variable for the decision system of an embodiment, the input variable comprising the biogas price in arbitrary units (AU) (on the Y-axis) as a function of time (on the X-axis)

In embodiments, predicted or contracted future prices may be utilized to enable decision making. If energy is procured in a contract with fixed or pre-determined prices, the future price will be known exactly. In other embodiments and examples, such as for grid power, predicted prices are known from grid operators or energy data suppliers. These prices may vary every hour or every 15-minute which may demand a change in operation of the intermediate processing facility 50 to manage CI whilst achieving the lowest overall cost. FIGS. 4B to 4D show graphs of typical profiles for these input variables.

FIG. 4B shows the spot power price in arbitrary units (AU) (on the Y-axis) as a function of time (on the X-axis). FIG. 4C shows natural gas price in arbitrary units (AU) (on the Y-axis) as a function of time (on the X-axis). FIG. 4D shows the biogas price in arbitrary units (AU) (on the Y-axis) as a function of time (on the X-axis).

This data may be received by a data input element 120-$n$ of the data input block 120 and input to the data input module 138 for use by the decision system 134.

Input 3: CI Limits and Calculation Rules

For a fuel to be considered "green" and to qualify for incentives, every jurisdiction has a limit on the carbon intensity for a fuel. For example, if a fuel is used in mobility applications, it has a CI limit of 28.2 gCO2/MJ in the European Union, and 32.9 gCO2/MJ in the UK. If used for industrial applications, the limits are different such 20 gCO2/MJ in UK.

The rules upon which CI calculations are based also vary by jurisdiction. For example, in the UK, CI values are calculated based on annual energy consumption and annual production. In contrast, in EU countries, the CI values must be calculated on a monthly basis.

Further, additional rules governing balancing of electricity production and consumption are applicable, such as electricity generated in an hour has to be consumed within that hour. This may in principle be further restricted to 15-minute balancing time windows at a future time.

Furthermore, there are rules on whether renewable energy from new sources for a fuel can be considered green, and rules regarding the CI values of biogenic gases such that biogenic gas has 0 gCO2/MJ CI in the UK and −110 gCO2/MJ CI in other jurisdictions. All such technical rules on CI calculation need to be provided to the decision system to enable calculation of CI correctly and then make operational decisions to manage that CI for the produced and transported fuel.

This data may be received by a data input element 120-$n$ of the data input block 120 and input to the data input module 138 for use by the decision system 134.

Input 4: Production Rates and Demand

In embodiments, the operation processes 152, 154, 156 have particular constraints on both production and operation in order to produce a specific amount of produce each day. The operation processes 152, 154, 156 may have specific industrial customers that obtain the fuel from a pipeline and may require constant flow of fuel, setting a minimum value of production which must be maintained.

In addition, refuelling stations may require predictable supply of product. The decision system 134 must account for satisfying customer demand while making energy use decisions.

Further, data on the current operation of the production plants 52, 54, 56 can also be sent and input to the data input module 138 for use by the decision system 134.

Input 5: Past Operation Data and Energy Use Decisions

Since CI calculations are performed on a monthly or a yearly basis, historical decisions must also be known and utilised by the decision system 134. Thus, historical time-dependent operational characteristic data for the industrial process plants forming the intermediate processing facility 50 are required. This data may take any suitable form and may be specific to a particular type of industrial gas plant.

By historical is meant past operational characteristic data. This may be gathered in any suitable time window, and may include data within a moving window which extends up to but not including the present time. The window may in embodiments be six months to a year long.

Future decisions for rest of the year or month depend upon past decisions. If past decisions have led to a CI value much below required limits, there is more leeway in future for taking lower cost-higher CI decisions and vice-versa.

The historical operational characteristic data is needed to understand the operating characteristics of process plants 52, 54, 56 forming the intermediate processing facility 50. For example, if technical information is needed regarding the quantity natural gas to be input in order to process 1 tonne of ammonia in the ammonia cracker 52, or how much electricity is needed to liquefy 1 kg of hydrogen in the liquefier 54, this technical information can be provided from historical operational characteristic data.

In embodiments, this data is needed because operational parameters of plant systems may change over time due to phenomena such as tube fouling, catalyst aging, intercooler fouling etc. By continuously learning from past data, improved outcomes may be generated from the decision system 134.

This data may be received by a data input element 120-$n$ of the data input block 120 and input to the data input module 138 for use by the decision system 134.

Example Operation of Decision System 134

The decision system 134 is adaptable depending upon the necessary requirements of the application being processed. For example, in embodiments, the period over which product demand and CI (two specific constraints in this example) must be managed.

As an example, consider the EU rules for RFNBO for mobility users. Such a product is required to have a maximum CI of 28.2 gCO2/MJ, calculated on a monthly basis. Further, assume that an average of 25 metric tons/day of liquid hydrogen is required for fueling stations and an additional constant 35 metric tons/day of gaseous hydrogen is required for an industrial user. The decision system needs to calculate the following outputs:

I) Rate at which to run liquefier in each hour for rest of the month so that each day's total is 25 tons;

II) How much grid power to buy in each hour to supplement contracted renewable power to ensure all power needs are met while maintaining CI; and III) How much renewable power to sell to the grid in each hour when there is excess renewable power. Power is bought from grid in some hours and sold to grid in some hours. In addition to maintaining CI, grid and renewable trade is also done to manage cost of energy.

IV) How much natural gas to use, biogenic natural gas to use, and/or ammonia to use in each hour for cracking operations. If CI is not managed by renewable power alone, more expensive biogas or ammonia is needed to manage CI.

In embodiments, the decision system 134 is operable to determine values for I) to IV) above by solving an optimization problem. As noted, this problem is typically a non-linear programming problem solved using non-linear mathematical programming techniques.

The objective function of the problem is to minimize the cost of making hydrogen while maintaining demand requirements and CI constraints.

In embodiments, the optimization problem may be solved for the remainder of a month in hourly intervals. Liquefier 54 production rates for the remainder of the month may be determined in order to maximize the usage of renewable power and maintain CI values for the produced and transported fuel below required level.

Further, in embodiments, even when renewable power is not available, the ammonia cracker 52 and liquefier 54 need to run using grid power 64 to fulfil end user demand. In embodiments, the time for which there is no or low renewable power available is relatively small and the monthly CI impact of the grid power is unlikely to exceed the CI requirement.

In other examples, the CI impact of grid power use may be high and then biogenic gas 66-2 or ammonia 66-3 may be used for cracking in the ammonia cracker 52. However, these decisions have a further dependency upon the relative costs of biogas, renewable power, and grid power.

If a cost difference between contracted renewable power and the spot grid power is high, the decision system 134 may utilize biogas or ammonia cracking may be utilized to allow the operator to sell power to grid. All these decisions to be taken for rest of the month can be quite complex and need computation decision system to be implemented properly.

In embodiments, the calculation may be repeated every few hours or every day, and the decisions resulting from the optimization implemented for the next few hours to a day. In embodiments, the liquefier 54 and cracker 52 operational rates may be communicated as process set points to computer control system.

In embodiments, a decision to use ammonia in self-fueling mode is also communicated as a process set point to the control system 100. Decision on trading grid power or substituting natural gas for biogas are to be communicated to human operators as an output on a computer screen, who implement these decisions on trading platforms.

Figures 4E, 4F:
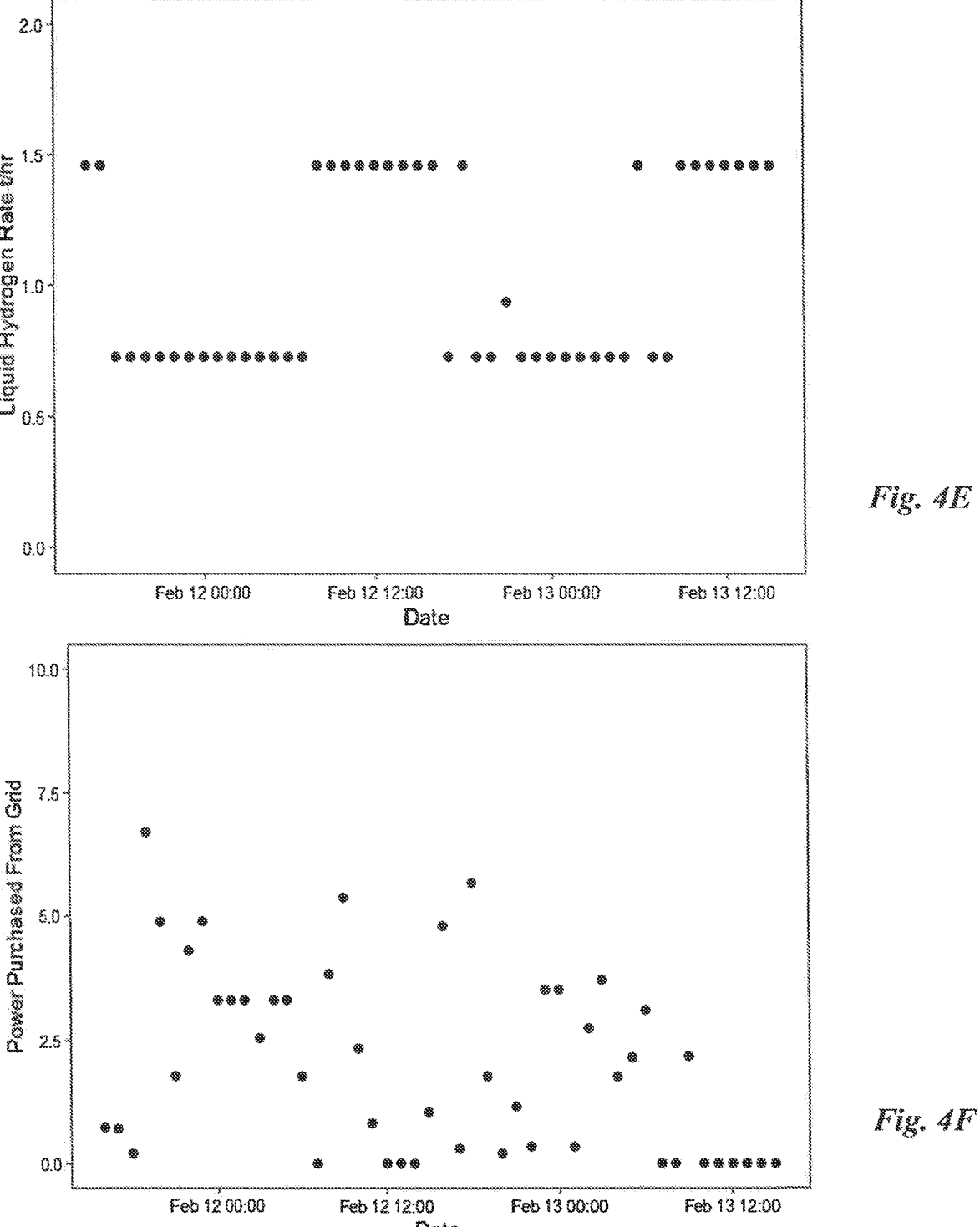
FIG. 4E is a graph showing an exemplary output variable from the decision system of an embodiment, the output variable comprising the liquid hydrogen production rate (in tonnes per hour) (on the Y-axis) as a function of time (on the X-axis)
FIG. 4F is a graph showing another exemplary output variable from the decision system of an embodiment, the output variable comprising the power purchased from the power grid in arbitrary units (AU) (on the Y-axis) as a function of time (on the X-axis)
Figures 4G, 4H:
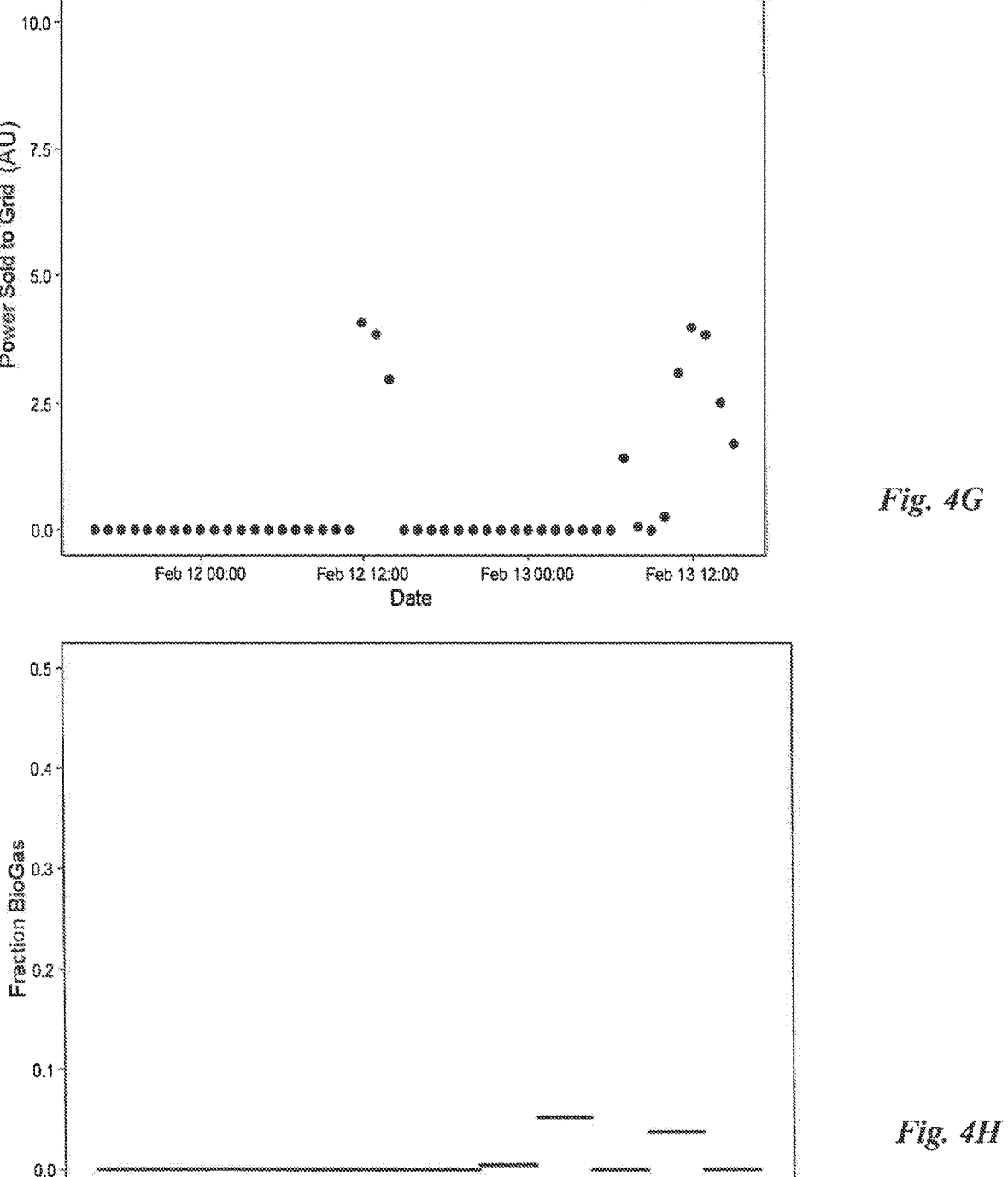
FIG. 4G is a graph showing another exemplary output variable from the decision system of an embodiment, the output variable comprising the power sold to the power grid in arbitrary units (AU) (on the Y-axis) as a function of time (on the X-axis)
FIG. 4H is a graph showing another exemplary output variable from the decision system of an embodiment, the output variable comprising the fraction of biogas used in an ammonia cracker in arbitrary units (AU) (on the Y-axis) as a function of time (on the X-axis)
Figure 5:
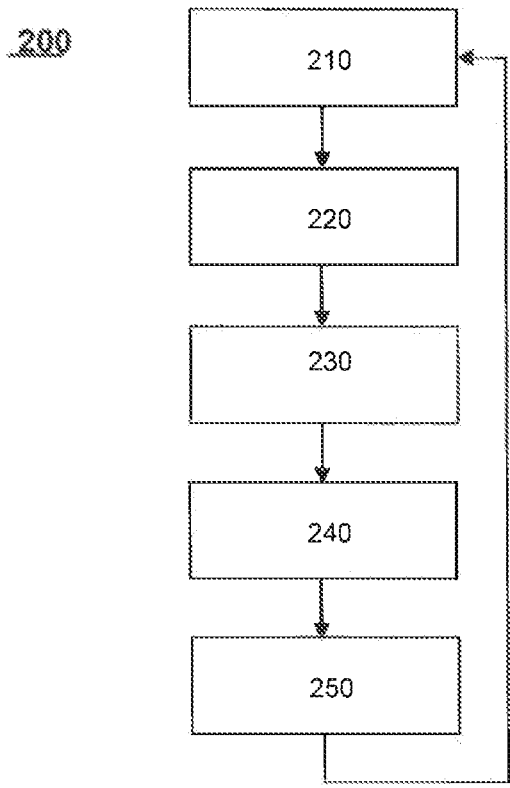
FIG. 5 is a flow diagram of a method according to an embodiment.

FIGS. 4E to 4H show graphs of the profile of exemplary output variables from the decision system 134. In FIG. 4E, the output variable comprises the liquid hydrogen production rate (in tonnes per hour) (on the Y-axis) as a function of time (on the X-axis). FIG. 4F shows the power purchased from the power grid in arbitrary units (AU) (on the Y-axis) as a function of time (on the X-axis). FIG. 4G shows the power sold to the power grid in arbitrary units (AU) (on the Y-axis) as a function of time (on the X-axis), and FIG. 4H shows the fraction of biogas used in an ammonia cracker in arbitrary units (AU) (on the Y-axis) as a function of time (on the X-axis).

Method

FIG. 4 shows a method 200 according to an embodiment. In embodiments, there is provided a method operable to provide hydrogen having a defined carbon intensity (CI) value. In embodiments, there is provided a method of controlling one or more industrial processes within a hydrogen supply network comprising one or more feedstock sources, one or more processes and one or more end-users. The method is executed by at least one hardware processor.

At step 210, a total end-to-end maximum CI value for the hydrogen from production of the hydrogen to delivery of the hydrogen to an end user location in order to meet predetermined CI requirements for the hydrogen is selected. This may be set by any suitable parameter or may be based on governmental or client requirements.

At step 220, the intermediate processing facility 50, powered at least in part by renewable power sources, receives one or more feedstocks, the one or more feedstocks being, in use, processed by the one or more industrial plants to provide hydrogen.

At step 230 one or more product CI values associated with each feedstock and/or the produced hydrogen are received by a computer system. In embodiments, the feedstock(s) may have a first product CI value for production of the feedstock(s) in a production facility or facilities and a second product CI value for transportation of the feedstock(s) from the production facility to the industrial processing facility.

In embodiments, a third product CI value defining the CI value for onward transportation of a predetermined volume of hydrogen from the industrial processing facility (in embodiments, the intermediate processing facility 50) to the end user location may be received.

At step 240, demand data defining the end user demand for the hydrogen is received, the end user demand for the hydrogen being defined as a volume of hydrogen required as a function of time.

At step 250, renewable power data related to the available renewable power from the renewable power sources as a function of time is received by a computer system.

At step 260, one or more constraints are defined in the decision system 134 comprising an optimization model. The constraints are selected from one or more of: the constraints being selected from the group of: the maximum CI value; the one or more product CI values; the demand data; and the renewable power data;

At step 270, the optimization model is utilized to generate a control strategy for control of the intermediate processing facility 50 which is operable to satisfy the one or more constraints. The control strategy comprises values of one or more control variables for control of operational parameters of the one or more industrial plants.

In embodiments, the optimization model may be utilized to generate a set of state variables (which may be optimized state variables) for the process plants 52, 54, 56 under consideration. In embodiments, this may be done by solving an optimization problem. For example, in non-limiting embodiments the optimization model may define the received data as a set of non-linear equations. The state variables are then generated by solving the set of non-linear equations.

At step 280, the intermediate processing facility 50 is controlled in accordance with the values of the control variables to process the one or more feedstocks in order to provide a required quantity of hydrogen meeting the selected total end-to-end maximum CI value for use by an end user.

In embodiments, the industrial processing facility may be controlled in accordance with the control strategy to produce hydrogen meeting the selected total end-to-end maximum CI value. In embodiments, the generated state variables (which may be optimized state variables) generated as part of the control strategy of step 240 are utilized to generate a set of control set points for the process plants 52, 54, 56 under consideration.

The set points may be defined to achieve the specified goals set out in the control strategy to achieve the required CI values for the hydrogen and to meet end user demand. In addition, the set points may be defined at a particular time to ensure that the process plants 52, 54, 56 under consideration are operated efficiently and effectively given the power and storage resources available and CI and demand constraints.

It will be appreciated by the person of skill in the art that various modifications may be made to the above-described examples without departing from the scope of the invention as defined by the appended claims.

While the invention has been described with reference to the preferred embodiments depicted in the figures, it will be appreciated that various modifications are possible within the spirit or scope of the invention as defined in the following claims.

For example, whilst the above exemplary embodiments have been described in the context of a fuel supply network for supplying hydrogen fuel, the invention is not so limited. The invention is equally applicable to the process of providing hydrogen having a defined carbon intensity value to an end user location for purposes other than as a fuel. In other words, in embodiments, the fuel supply network may be considered to be a hydrogen supply network for the supply of hydrogen for any suitable purpose.

It will be understood that the term "control strategy" as used herein may, in embodiments, refer to a systematic plan or set of actions designed to manage and optimize the operation of an industrial processing facility, in order to produce fuel with a defined carbon intensity value, while considering factors such as feedstock carbon intensity, demand data, and process constraints.

It will be understood that the term "control" as used herein may refer to the management and regulation of the operations of the industrial plants of the industrial processing facility, ensuring that the production of hydrogen and/or hydrogen fuel adheres to the defined carbon intensity value and other constraints set by the optimization model.

It will be understood that the term "fuel" as used herein may refer to any type of fuel used to power processes (including industrial processes) for turning stored fuel energy into useful work. The term "fuel" used herein may include, but is not limited to, "transportation fuels" used to power vehicles for the purpose of facilitating the movement of people or goods.

It will be understood that the term "Defined carbon intensity (CI) value" as used herein may refer to a predetermined or specified value for the greenhouse gas emissions associated with the production, processing and distribution of a product such as hydrogen or hydrogen fuel, expressed in terms of mass of carbon dioxide equivalent per unit of energy, and used as a target or constraint in the optimization process for producing the fuel in an environmentally sustainable manner.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules", "units" or "components," these terms should not limited to single units or functions. In addition, functionality attributed to some of the modules or components described herein may be combined and attributed to fewer modules or components.

It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A computer-implemented method of providing hydrogen having a defined carbon intensity (CI) value to an end user location, the process being executed by at least one hardware processor and comprising:

selecting, using a computer system, a total end-to-end maximum CI value for the hydrogen from production to delivery of the hydrogen to an end user location in order to meet predetermined CI requirements for the hydrogen;

receiving, by an industrial processing facility having one or more industrial plants powered at least in part by renewable power sources, one or more feedstocks, the one or more feedstocks being processed by the one or more industrial plants to provide hydrogen;

receiving, using a computer system, one or more product CI values associated with each feedstock and/or the produced hydrogen;

receiving, using a computer system, demand data defining the end user demand for the hydrogen, the end user demand for the hydrogen being defined as a quantity of hydrogen required as a function of time;

receiving, using a computer system, renewable power data related to the available renewable power from the renewable power sources as a function of time;

defining, in an optimization model, a plurality of constraints, the constraints being selected from the group of: the maximum CI value; the one or more product CI values; the demand data; and the renewable power data;

generating, using the optimization model, a control strategy for control of the one or more industrial plants operable to satisfy the one or more constraints, the control strategy comprising values of one or more control variables for control of operational parameters of the one or more industrial plants; and controlling the industrial plants in accordance with the values of the control variables to process the one or more feedstocks in order to provide a required quantity of hydrogen meeting the selected total end-to-end maximum CI value for use by an end user;

wherein a feedstock comprises ammonia and an industrial plant comprises an ammonia cracker plant to produce hydrogen.

2. A computer-implemented method according to claim 1, wherein the one or more product CI values comprises, for each feedstock, a first CI value for production of the feedstock in a production facility and a second CI value for transportation of the feedstock from the production facility to the industrial processing facility.

3. A computer-implemented method according to claim 2, wherein the one or more product CI values comprises a third CI value defining the CI value for onward transportation of a predetermined quantity of hydrogen from the industrial processing facility to the end user location.

4. A computer-implemented method according to claim 1, wherein one or more control variables comprise the hydrogen production rate of the ammonia cracker plant.

5. A computer-implemented method according to claim 1, wherein one or more control variables comprise the selection of the type of cracker fuel for operating the ammonia cracker plant from one or more of: natural gas; biogenic natural gas; and ammonia.

6. A computer-implemented method according to claim 1, wherein an industrial plant comprises a hydrogen liquefier plant.

7. A computer-implemented method according to claim 6, wherein one or more control variables comprises the production rate of the hydrogen liquefier plant.

8. A computer-implemented method according to claim 1, wherein an industrial plant comprises a hydrogen compressor arrangement.

9. A computer-implemented method according to claim 8, wherein one or more control variables comprise the operation rate of the hydrogen compressor arrangement.

10. A computer-implemented method according to claim 1, wherein one or more control variables relate to selection of the power source for powering the industrial processing facility as a function of time.

11. A computer-implemented method according to claim 10, wherein the power source is selected from one or more renewable power sources and/or grid power.

12. An industrial processing facility operable to provide hydrogen having a defined carbon intensity (CI) value to an end user location, the industrial processing facility comprising one or more industrial plants powered at least in part by renewable power sources, and a computer system comprising at least one hardware processer, the industrial processing facility being configured to:

select, using a computer system, a total end-to-end maximum CI value for the hydrogen from production to delivery of the hydrogen to an end user location in order to meet predetermined CI requirements for the hydrogen;

receive, by an industrial processing facility, one or more feedstocks, the one or more feedstocks being processed by the one or more industrial plants to provide hydrogen;

receive, using a computer system, one or more CI values associated with each feedstock and/or the produced hydrogen;

receive, using a computer system, demand data defining the end user demand for the hydrogen, the end user demand for the hydrogen being defined as a quantity of hydrogen required as a function of time;

receive, using a computer system, renewable power data related to the available renewable power from the renewable power sources as a function of time;

define, in an optimization model, a plurality of constraints, the constraints being selected from the group of: the maximum CI value; the one or more CI values; the demand data; and the renewable power data;

generate, using the optimization model, a control strategy for control of the one or more industrial plants operable to satisfy the one or more constraints, the control strategy comprising values of one or more control variables for control of operational parameters of the one or more industrial plants; and control the industrial plants in accordance with the values of the control variables to process the one or more feedstocks in order to provide a required quantity of hydrogen meeting the selected total end-to-end maximum CI value for use by an end user;

wherein an industrial plant comprises an ammonia cracker plant to produce hydrogen and wherein a feedstock comprises ammonia.

13. An industrial processing facility according to claim 12, wherein one or more control variables comprise the hydrogen production rate of the ammonia cracker plant.

14. An industrial processing facility according to claim 12, wherein one or more control variables comprise the selection of the type of cracker fuel for operating the ammonia cracker plant from one or more of: natural gas; biogenic natural gas; and ammonia.

15. An industrial processing facility according to claim 12, wherein an industrial plant comprises a hydrogen liquefier plant.

16. An industrial processing facility according to claim 15, wherein one or more control variables comprises the production rate of the hydrogen liquefier plant.

17. An industrial processing facility according to claim 12, wherein an industrial plant comprises a hydrogen compressor arrangement.

18. A non-transitory computer readable storage medium storing a program of instructions executable by a machine to perform a method of providing hydrogen having a defined carbon intensity (CI) value to an end user location, the process being executed by at least one hardware processor and comprising:

selecting, using a computer system, a total end-to-end maximum CI value for the hydrogen from production to delivery of the hydrogen to an end user location in order to meet predetermined CI requirements for the hydrogen;

receiving, by an industrial processing facility having one or more industrial plants powered at least in part by renewable power sources, one or more feedstocks, the one or more feedstocks being processed by the one or more industrial plants to provide hydrogen;

receiving, using a computer system, one or more CI values associated with each feedstock and/or the produced hydrogen;

receiving, using a computer system, demand data defining the end user demand for the hydrogen, the end user demand for the hydrogen being defined as a quantity of hydrogen required as a function of time;

receiving, using a computer system, renewable power data related to the available renewable power from the renewable power sources as a function of time;

defining, in an optimization model, a plurality of constraints, the constraints being selected from the group of: the maximum CI value; the one or more CI values; the demand data; and the renewable power data;

generating, using the optimization model, a control strategy for control of the one or more industrial plants operable to satisfy the one or more constraints, the control strategy comprising values of one or more control variables for control of operational parameters of the one or more industrial plants; and controlling the industrial plants in accordance with the values of the control variables to process the one or more feedstocks in order to provide a required quantity of hydrogen meeting the selected total end-to-end maximum CI value for use by an end user;

wherein a feedstock comprises ammonia and an industrial plant comprises an ammonia cracker plant to produce hydrogen.

\* \* \* \* \*